United States Patent [19]

Yeakey et al.

[11] Patent Number: 5,153,287
[45] Date of Patent: Oct. 6, 1992

[54] PREPARATION OF HYDROXYLATED LOW MOLECULAR WEIGHT POLYMODAL BUTADIENE POLYMERS

[75] Inventors: Ernest L. Yeakey; Wei-Yang Su, both of Austin, Tex.

[73] Assignee: Texaco Chemical Company, White Plains, N.Y.

[21] Appl. No.: 596,822

[22] Filed: Oct. 12, 1990

[51] Int. Cl.⁵ .................................................. C08F 4/30
[52] U.S. Cl. ...................................... 526/229; 526/335
[58] Field of Search ................................. 526/229, 335

[56] References Cited

U.S. PATENT DOCUMENTS

| | | | |
|---|---|---|---|
| 3,673,168 | 6/1972 | Burke, Jr. et al. | 524/761 |
| 3,796,762 | 3/1974 | Verdol et al. | 526/208 |
| 3,808,281 | 4/1974 | Verdol et al. | 526/193 |
| 4,518,770 | 5/1985 | Kaplan et al. | 526/229 |
| 4,606,913 | 8/1986 | Aronson et al. | 424/63 |

FOREIGN PATENT DOCUMENTS

| | | | |
|---|---|---|---|
| 60-110708 | 6/1985 | Japan | 526/229 |
| 7306884 | 8/1973 | Netherlands | 526/229 |
| 957788 | 5/1964 | United Kingdom . | |

OTHER PUBLICATIONS

Advances in Chemistry Series 125 ACS Wasington D.C. (1973) Nakajima pp. 98–107.

Primary Examiner—Joseph L. Schofer
Assistant Examiner—N. Sarofin
Attorney, Agent, or Firm—Jack H. Park; Kenneth R. Priem; Carl G. Ries

[57] ABSTRACT

Hydroxy-containing, propylene carbonate insoluble butadiene polymers having an average molecular weight of about 400 to about 25,000 and containing an average of about 2 hydroxyl groups per molecule are prepared by polymerizing butadiene in a homogeneous reaction medium consisting essentially of a propylene carbonate solution of an aqueous solution of hydrogen peroxide at a temperature within the range of about 100° to about 200° C. for a reaction time within the range of about 1 to about 2 hours to thereby form the butadiene polymer and by recovering the butadiene polymer.

6 Claims, No Drawings

PREPARATION OF HYDROXYLATED LOW MOLECULAR WEIGHT POLYMODAL BUTADIENE POLYMERS

BACKGROUND OF THE INVENTION

1. Field of the Invention

This invention relates to a method for the preparation of hydroxy-containing propylene carbonate insoluble butadiene polymer having an average molecular weight of about 400 to about 25,000 wherein the butadiene is polymerized in a homogeneous reaction medium composed of a propylene carbonate solution of aqueous hydrogen peroxide. More particularly, this invention is related to a simplified method for the preparation of hydroxy-containing butadiene polymers wherein butadiene is polymerized in a homogeneous reaction medium consisting essentially of a propylene carbonate solution of an aqueous solution of hydrogen peroxide to form a propylene carbonate insoluble hydroxy-containing butadiene polymer and wherein the reaction product is withdrawn from the reactor and allowed to settle, resulting in the formation of a supernatent layer of the insoluble butadiene polymer which is recovered with comparative ease.

2. Prior Art

It is known to prepare hydroxy-containing low molecular weight butadiene polymers by the hydrogen peroxide catalyzed polymerization of butadiene in a reaction medium. Such processes are disclosed, for example, in British Patent No. 957,788, Verdol et al. U.S. Pat. No. 3,796,762, Verdol et al. U.S. Pat. No. 3,808,281 and Burke et al. U.S. Pat. No. 3,673,168.

The Verdol et al. U.S. Patents disclose processes for polymerizing a conjugated diene monomer such as butadiene in the presence of aqueous hydrogen peroxide in an essentially water insoluble reaction medium such as an alicyclic, monocyclic alcohol or ketone (U.S. Pat. No. 3,796,762) or an essentially water-insoluble trihydrocarbol orthophosphate ester (U.S. Pat. No. 3,808,281).

The Verdol methods rely upon the use of water insoluble solvents so that the reaction system has at least two liquid phases.

The products that are formed by the Verdol et al. processes have molecular weights within the range of about 400 to about 25,000, contain at least about 1.8 predominantly allylic, terminal hydroxyl groups per average molecule and are prepared by the hydroperoxide catalyzed polymerization of the conjugated diene in the solvent, as above described, at a temperature of about 100° to about 200° C. in the presence of about 0.5 to about 30 wt. %, based on the conjugated diene monomer, of a hydrogen peroxide catalyst on an anhydrous basis, the hydrogen peroxide catalyst being used in the form of an aqueous solution containing from about 25 to about 75 wt. % of hydrogen peroxide.

SUMMARY OF THE INVENTION

The present invention has for its objective the preparation of hydroxyl terminated butadiene polymers having molecular weights within the range of about 400 to about 25,000 and containing hydroxyl groups. However, the molecular weight distribution of the products are polymodal, as contrasted with the monomodal distribution of Arco products. The butadiene polymers of the present invention contain both 1,4-type polymerization segments and 1,2-type polymerization segments.

It has been discovered in accordance with the present invention that a single phase reaction medium may be used for the polymerization of the butadiene when the solvent is propylene carbonate since both the butadiene and the aqueous solution of hydrogen peroxide that is used to catalyze the polymerization are soluble in the propylene carbonate.

It has been further discovered in accordance with the present invention that the hydroxy-containing butadiene polymer that is formed as a result of the polymerization is essentially insoluble in propylene carbonate. As a consequence, when the polymerization product is withdrawn from the reaction vessel and allowed to settle, the hydroxy-containing butadiene polymer will form a separate supernatent layer from which it can be easily recovered by simple decantation. Satisfactory purification can be obtained by water washing of the decanted polymer.

DETAILED DESCRIPTION OF THE PRESENT INVENTION

The starting materials for the present invention are butadiene monomer, propylene carbonate and an aqueous solution of hydrogen peroxide.

The hydrogen peroxide, which is used to polymerize the butadiene polymerization is preferably used in the form of an aqueous solution containing from about 25 to about 75 wt. % of hydrogen peroxide and, more preferably, about 40 to about 60 wt. % of hydrogen peroxide (e.g., about 50 wt. %).

The solvent that is used in accordance with the present invention is propylene carbonate.

In accordance with the preferred embodiment of the present invention, the aqueous solution of the hydrogen peroxide is mixed with the propylene carbonate prior to the introduction of butadiene. However, this is not absolutely necessary. In any event, the amount of hydrogen peroxide that is used should be an amount sufficient to provide a polymerization medium containing from about 5 to about 15 wt. % of hydrogen peroxide, the balance of the reaction medium consisting of propylene carbonate and water.

The propylene carbonate solution of the aqueous solution of hydrogen peroxide is preferably charged from a suitable reactor such as an autoclave fitted with an agitator, and the autoclave is purged of oxygen (e.g., by a nitrogen purge).

Thereafter, butadiene is added to the reaction medium with agitation and the polymerization is conducted for about 1 to about 2 hours at a temperature within the range of about 100° to about 200° C. More preferably, the reaction is conducted at a temperature within the range of about 110° to about 140° C. for a period within the range of about 1 to about 1.5 hours.

The amount of butadiene charged to the reactor may be varied within comparatively wide limits. Preferably, from about 50 to about 200 parts of butadiene are used per 100 parts of the homogeneous reaction medium.

At the end of the reaction, the polymerization product may be removed from the reactor. In order to ensure completion of the reaction, it is preferable that to hold the polymerization medium in the reactor for an additional 1 to 2 hours at the polymerization temperature employed. Under these circumstances, from about 30 to about 70 wt. % of the butadiene that is charged to the reactor will be converted to hydroxy-containing butadiene polymer.

At the end of the reaction, the unreacted vented butadiene may be vented from the reactor and the liquid contents of the reactor may be discharged to any suitable vessel, such as a decantation vessel wherein the hydroxy-containing butadiene polymer will separate as a separate supernatent layer which is removed with ease by decantation.

Final purification of the thus-formed hydroxy-containing polybutadiene can be obtained by a simple water washing step.

WORKING EXAMPLES

The invention will be further illustrated by the following working examples which are given by way of illustration only and which are not intended as limitations on the scope of the invention.

EXAMPLE 1 (6218-59)

A 1-liter stirring autoclave equipped with Pyrex liner was used. Propylene carbonate (180 g) and 50% aqueous hydrogen peroxide (30 g ) were charged into the reactor. The reactor was sealed and purged of air by $N_2$. The full amount of 1,3-butadiene (255 g) was then added into the autoclave. The contents of the reactor were heated to 150° C. in 75 minutes and held for 2 hours with stirring. The maximum pressure during the polymerization was 320 psig. The reactor was cooled to room temperature and the reaction mixture was withdrawn from the reactor. The upper polymer-containing phase was separated and washed with water a few times. The polymer was dried under the vacuum and the heat. A GPC analysis showed that the resulting polymer presents polymodal distribution and the average molecular weight of polymer is similar to the ARCO Poly bd ® Resins R-45HT.

EXAMPLE 2 (6278-02)

A 1-liter stirring autoclave equipped with Pyrex liner was used. Propylene carbonate (150 g) was charged into the reactor. The reactor was purged of air by $N_2$. The reactor was heated to 150° C. with stirring and held at 120° C. A solution of hydrogen peroxide, water and propylene carbonate (1:1:2 by weight; 60 g) and 1,3-butadiene (255 g) were fed into the reactor proportionally during a 1 hour period. The reaction mixture was stirred for an additional hour at 120° C. The reactor was cooled to room temperature and the reaction mixture was withdrawn from the reactor. The upper polymer-containing phase was separated and washed with water a few times. The polymer was dried under the vacuum and the heat. ABout 55% conversion of butadiene was obtained. The liquid polymer had a hydroxyl value of 0.790 meq/g. The number-average molecular weight is about 2800 indicated b GPC analysis using ARCO R-45HT as reference.

EXAMPLE 3 (6278-17)

Same amounts of reagents were subjected to a reaction as described in Example 2 above except that the polymerization temperature was 110° C. About 40% conversion of butadiene was obtained. The liquid polymer had a hydroxyl value of 0.904 meq/g.

Having thus described our invention, what is claimed is:

1. A method for preparing a hydroxy-containing, propylene carbonate insoluble polymodal butadiene polymer having an average molecular weight of about 400 to about 25,000 and containing an average of about 2 hydroxyl groups per molecule which comprises polymerizing butadiene in a homogeneous reaction medium consisting essentially of a propylene carbonate solution of an aqueous solution of hydrogen peroxide at a temperature within the range of about 100° to about 200° C. for a reaction time within the range of about 1 to about 2 hours to thereby form said butadiene polymer and recovering said butadiene polymer, said aqueous solution of hydrogen peroxide containing about 25 to about 75 wt. % of hydrogen peroxide, said propylene carbonate solution of said aqueous hydrogen peroxide containing about 5 to about 15 wt. % of hydrogen peroxide.

2. A method as in claim 1 wherein the aqueous solution of hydrogen peroxide contains about 50 wt. % of hydrogen peroxide.

3. A method as in claim 2 wherein the reaction is conducted at a temperature of about 110° to about 150° C.

4. A method for preparing a hydroxy-containing, propylene carbonate insoluble polymodal butadiene polymer having an average molecular weight of about 400 to about 25,000 and containing an average of about 2 hydroxyl groups per molecule which consists essentially of adding from about 50 to about 200 parts by weight of butadiene per 100 parts by weight of a homogeneous reaction medium consisting essentially of a propylene carbonate solution of an aqueous solution of hydrogen peroxide to a reactor containing said homogeneous reaction medium and polymerizing said butadiene therein at a temperature within the range of about 100° to about 200° C. for a reaction time within the range of about 1 to about 2 hours to form said propylene carbonate insoluble butadiene polymer, whereby said propylene carbonate insoluble butadiene polymer will accumulate as a separate phase, withdrawing the reaction medium from said reactor and recovering a supernatant layer of said propylene carbonate insoluble butadiene polymer from said reaction medium, said aqueous solution of hydrogen peroxide containing about 25 to about 75 wt. % of hydrogen peroxide, said propylene carbonate solution of said aqueous hydrogen peroxide containing about 5 to about 15 wt. % of hydrogen peroxide.

5. A method as in claim 4 wherein the aqueous solution of hydrogen peroxide contains about 50 wt. % of hydrogen peroxide.

6. A method as in claim 5 wherein the reaction is conducted at a temperature of about 110° to about 150° C.

* * * * *